(12) United States Patent
Pollock et al.

(10) Patent No.: US 7,949,353 B2
(45) Date of Patent: May 24, 2011

(54) SYSTEM AND METHOD FOR PROVIDING MESSAGES TO A MOBILE DEVICE

(75) Inventors: Ruth Pollock, Wilmslow (GB); Kieron Hudson, Gatley (GB)

(73) Assignee: Intervoice Limited Partnership, Las Vegas, NV (US)

(*) Notice: Subject to any disclaimer, the term of this patent is extended or adjusted under 35 U.S.C. 154(b) by 718 days.

(21) Appl. No.: 11/349,051

(22) Filed: Feb. 7, 2006

(65) Prior Publication Data
US 2007/0184857 A1  Aug. 9, 2007

(51) Int. Cl.
*H04W 4/00* (2009.01)
(52) U.S. Cl. ............ 455/466; 455/414.4; 455/414.1; 455/432.2; 455/412.1
(58) Field of Classification Search .......... 455/466, 455/403, 412.1–417, 575.2
See application file for complete search history.

(56) References Cited

U.S. PATENT DOCUMENTS

| | | | |
|---|---|---|---|
| 6,151,572 A | 11/2000 | Cheng et al. | |
| 6,483,899 B2 | 11/2002 | Agraharam et al. | |
| 6,760,727 B1 | 7/2004 | Schroeder et al. | |
| 6,829,348 B1 | 12/2004 | Schroeder et al. | |
| 6,868,143 B1 | 3/2005 | Menon et al. | |
| 7,062,020 B1 | 6/2006 | Pirasteh et al. | |
| 7,103,548 B2* | 9/2006 | Squibbs et al. | 704/260 |
| 2002/0128000 A1* | 9/2002 | do Nascimento, Jr. | 455/414 |
| 2003/0039340 A1 | 2/2003 | Deshpande et al. | |
| 2003/0144038 A1* | 7/2003 | Pugliese | 455/567 |
| 2003/0228866 A1* | 12/2003 | Pezeshki | 455/422.1 |
| 2004/0077363 A1 | 4/2004 | Lazaro et al. | |
| 2004/0266490 A1* | 12/2004 | Silver | 455/567 |
| 2004/0267527 A1 | 12/2004 | Creamer et al. | |
| 2005/0018651 A1* | 1/2005 | Yan et al. | 370/352 |
| 2005/0124324 A1* | 6/2005 | Thomas et al. | 455/412.1 |
| 2005/0159189 A1* | 7/2005 | Iyer | 455/566 |
| 2005/0170869 A1* | 8/2005 | Slemmer et al. | 455/575.1 |
| 2005/0190903 A1* | 9/2005 | Viikki | 379/142.01 |
| 2005/0197096 A1* | 9/2005 | Yang et al. | 455/404.1 |
| 2005/0232166 A1 | 10/2005 | Nierhaus | |
| 2005/0286498 A1 | 12/2005 | Rand et al. | |
| 2006/0143711 A1* | 6/2006 | Huang et al. | 726/23 |
| 2006/0276179 A1* | 12/2006 | Ghaffari et al. | 455/412.2 |
| 2007/0066283 A1* | 3/2007 | Haar et al. | 455/412.2 |

(Continued)

OTHER PUBLICATIONS

International Search Report and Written Opinion issued for PCT Application PCT/US2007/061674; Dated: Feb. 26, 2008; 12 Pages.

(Continued)

*Primary Examiner* — Huy Phan
(74) *Attorney, Agent, or Firm* — William S. Morriss; Frost Brown Todd LLC

(57) ABSTRACT

The present invention is directed to a system and method in which data messages, which otherwise would be displayed on the screen of a mobile device are delivered in audible format. The message itself, in one embodiment does not contain the audible message, but rather the message triggers the retrieval of an audible message (or if the user chooses, he/she can be prompted to view additional information in a text or video format on the phone). The audible, message that is ultimately delivered can be prestored in the mobile device; can be created based upon data sent to the device; can be retrieved from an external source, such as from a web server accessed by the mobile device in accordance with data contained in the message received by the mobile device; or it can be sent by the sender as a "whisper" message.

25 Claims, 5 Drawing Sheets

U.S. PATENT DOCUMENTS

2007/0105528 A1* 5/2007 Haas et al. ................. 455/404.1
2007/0117554 A1* 5/2007 Arnos ........................ 455/414.4
2008/0153456 A1* 6/2008 Wen et al. .................... 455/405
2009/0225977 A1* 9/2009 Cardina et al. ........... 379/220.01

OTHER PUBLICATIONS

International Search Report and the Written Opinion issued for PCT/US2007/062467, issued Nov. 15, 2007, 7 pages.
Office Action issued against U.S. Appl. No. 11/361,305 dated Oct. 28, 2010.
Office Action dated Nov. 29, 2010 for U.S. Appl. No. 11/208,028.
U.S. Appl. No. 11/208,028, filed Aug. 19, 2005, Potter, III.
U.S. Appl. No. 11/361,305, filed Feb. 24, 2006, Amis.
U.S. Appl. No. 11/691,127, filed Mar. 26, 2007, Pollock et al.
U.S. Appl. No. 12/055,712, filed Mar. 26, 2008, Akula et al.
Office Action dated Jan. 30, 2009 for U.S. Appl. No. 11/208,028.
Office Action dated Jun. 23, 2009 for U.S. Appl. No. 11/208,028.
Office Action dated Oct. 26, 2009 for U.S. Appl. No. 11/208,028.
Office Action dated Mar. 15, 2010 for U.S. Appl. No. 11/208,028.
Office Action dated Aug. 3, 2010 for U.S. Appl. No. 11/208,028.
Office Action dated Jun. 24, 2009 for U.S. Appl. No. 11/361,305.
Office Action dated Nov. 6, 2009 for U.S. Appl. No. 11/361,305.
Office Action dated Oct. 28, 2010 for U.S. Appl. No. 11/361,305.
Office Action dated Mar. 1, 2011 for U.S. Appl. No. 11/361,305.

* cited by examiner

Delivery of Sports Score

Note: Original message is not originated as an SMS

SYSTEM AND METHOD FOR PROVIDING MESSAGES TO A MOBILE DEVICE

TECHNICAL FIELD

This invention relates to mobile communication devices and more particularly to such devices in which it is desired to provide messages to the device user without requiring the user to engage their eyes or hands to obtain the message.

BACKGROUND OF THE INVENTION

Cellular telephones were originally conceived as a mobile extension of the wired telephone device, used primarily as a person-to-person audio communication device emulating the traditional conventional telephone. However, cellular telephones have been combined with other types of portable data devices, and are now being used more and more frequently to receive notifications from external sources. For example, Caller IDs, weather reports, personal text messages and video messages are all items that can be delivered to a modem mobile device.

The mobile user is often in a situation where it is impractical to either look at the screen on his/her mobile device for information or to operate keys to obtain the information. One popular service provided by cellular telephone providers is called the short message service (SMS), which sends the user information in the form of text. Text messages can be delivered to a recipient, but it requires the recipient to look at the device screen to view the message, diverting their eyes from other critical tasks. This channel, however, is not designed for the communication of speech. Accordingly, when a SMS message arrives for a user, the device produces a unique tone, and the user must read the screen display to obtain the message. Often the problem is compounded in that the user must manipulate one or more keys (or scroll) in order to read the incoming message. Sometimes the phone cover must be removed or unfolded in order to see the screen or use the keypad. This can present difficulties when the user's eyes or hands are otherwise occupied.

The problem is further compounded when the mobile device is used to receive SMS notifications or requests for calendar type appointments. In such a situation, the user must attempt to read the appointment (or other notification) and then respond with an acknowledgment or perhaps suggest an alternative date or time. This then requires the use of both the user's eyes and fingers which is not always practical when at the time the notification arrives. Sometimes the notification is of a direction of travel, such as, "turn left at the next block." In such situations, unless the user receives the message timely, the information is of no practical use In other situations visual information may arrive (or be generated within the device) concurrently with an incoming call. An example of this scenario is when a call arrives from a calling party and the caller's name is displayed on the device's screen (Caller ID) concurrently with the application of ring tone. The user must then focus his/her eyes on the screen of the device (which is often in a pocket or purse) in order to know who is calling. This same problem exists when the information displayed on the screen is flight information, sports scores, stock quotes, etc.

SUMMARY OF THE INVENTION

The present invention is directed to a system and method in which data messages, which otherwise would be displayed on the screen of a mobile device are delivered in audible format. The message itself in one embodiment does not contain the audible message but rather the message triggers the retrieval of an audible message (or if the user chooses, he/she can be prompted to view additional information in a text or video format on the phone). The audible message that is ultimately delivered can be prestored in the mobile device; can be created based upon data sent to the device; can be retrieved from an external source, such as from a web server accessed by the mobile device in accordance with data contained in the message received by the mobile device; or it can be created by the calling party. The receiving user could, if desired, cause a message to be returned to the sender. The returned message could be newly created by the receiving user or could be a prestored message triggered by a stimulus from the receiving user. In one embodiment, a notification server sends the message to the mobile device using the SMS channel. In another preferred embodiment, an IP based packed delivery mechanism utilizing the HLR database and the device address to identify the device to configure the information delivery presentation layer.

In one embodiment the called party could speak a response to the SMS message (that he/she heard as an audio message) and have a speech recognition system in the network (or perhaps on the phone) turn the spoken response into a new SMS message to be sent to the original sender.

In a still further embodiment, the SMS reply message could be extended to a Multimedia Message Service (MMS) message where the reply message is delivered in both audio, text, and/or video. The recipient could then decide how he/she wanted to receive the message, i.e., through audio in the headset and/or text (video) on the screen which text may include additional information.

In another preferred embodiment, an IP based packet delivery mechanism utilizing the HLR database and the device address to identify the device to configure the information delivery presentation layer. Additional information can be delivered by different channels depending on the notified party's device characteristics. By way of example, the user receives a whisper message announcing that the Steelers won the Super Bowl, the message could then speak the score. The user could then ask to see the winning touchdown video on the device screen.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

In operation, mobile device 10-1 would typically have screen 100 for the display of messages (including video messages) communicated to the device. As discussed above, mobile phone 10-1 has two channels for communication. One channel is designed for audible (typically voice) communications and the other channel is designed primarily for data. With IP based/SIP systems, the 'pipe' for voice and other data is the same and the QOS (designated priority) will replace the channel methodology.

Figure 1:
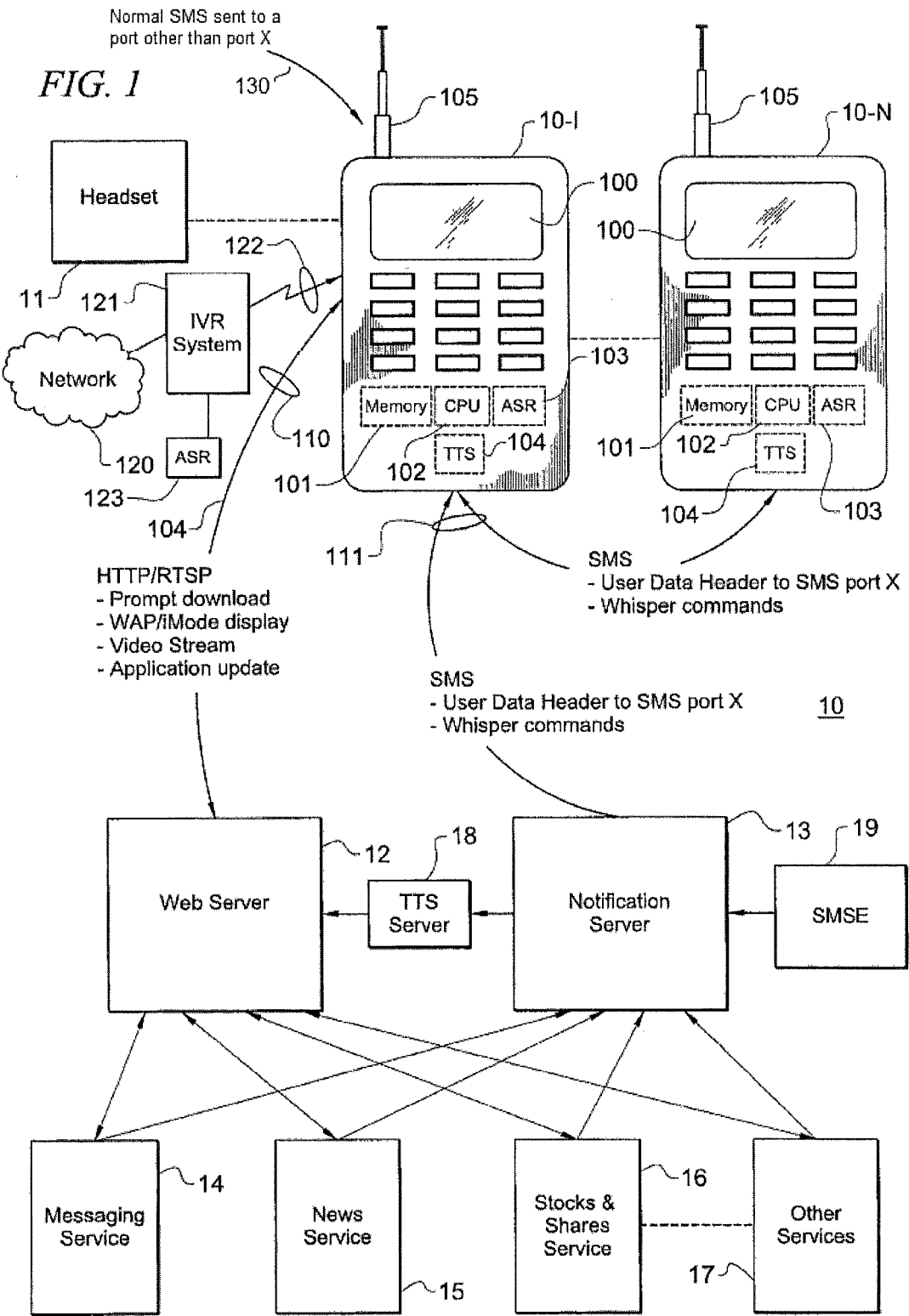
FIG. 1 shows one embodiment of a system operable for providing audible messages.

In FIG. 1, the audible communication path is depicted as path 122 from network 120. In this embodiment, intermediate switch 121 (which could be an interactive voice response (IVR system), as will be discussed, is shown for facilitating commands recorded from the mobile device. The data path is depicted as path 111. Both of these channels communicate via antenna 105. Such mobile devices have within them, screen 100, memory 101, CPU 102, as well as RF detection circuitry, transmitters and receivers (not shown), all of which are well-known in the art. Device 10-1 also may have a text to speech (TTS) engine 104 and also may have automated speech recognition (ASR) 103 that could be used to convert speech to text 103. Note that ASR and TTS will most likely be in the network in the near future but that devices will eventually have enough power for self-contained ASR and TTS as shown in FIG. 1.

In one embodiment, a ASR server can be attached to (accessible by) IVR system 121 so that a user can record a voice message, and have it turned into a text message (or email) to be sent to the recipient. The resulting text message could be delivered via Notification server 13 and SMS engine 19.

In the discussion to follow it is assumed that headset 11 is worn by the user of mobile device 10-1 and that communications between mobile device 10-1 and headset 11 are private. For ease of discussion herein communications which are generated as a result of a message arriving on data path 111, or text or data received over communication channel 110, or a message designated by the calling party as a whisper message will be communicated to headset 11 in a "whisper" manner. In this context the word "whisper" is used for ease of discussion herein and is the same type of communication that would normally be communicated to the user via the speaker or headphone. However, if desired, the whisper message could have a distinctive quality (perhaps a whisper voice) so that the listener knows the communication being received is a communication triggered by a message input as opposed to a communication that is being received via the normal communication channel, such as from channel 122. If desired, the user might wish to selectively receive whisper messages, perhaps by pressing a key on the mobile device. Also note that, as will be discussed, it is possible for the mobile device to generate internal messages, for example from an alarm or calendar application residing in the device.

The audio delivery mechanism could be a wired headset, a wireless headset, a collar speaker, the speakerphone in the user's device or any other form of input signal to speech transducer.

Let us assume that notification server 13 has been instructed by any one of the many services to which it can be connected or accessed (such as messaging service 14, new service 15, stocks and shares service 16, or other services 17) to communicate a message to the user of mobile device 10-1. This message could be a message giving a sports score, a stock quote, a news headline; or it could be an e-mail message or calendaring message, etc. Notification server then selects a specific port of the target device, for example, port X, and sends a text message in the well-known SMS format. The text message contains within it information that will trigger the communication of an audible whisper message to the speaker/headset of mobile device 10-1. The reason that a specific port is selected is so that this SMS message, which is designed to trigger a whisper message, is not confused with other SMS messages. Mobile device 10-1 will recognize, as will be discussed herein, that there is information contained within the message which information is then used by text to speech (TTS) engine 104 device 10-1 to create a whisper message to the user. In addition, as will be discussed the SMS message could trigger a message over communication path 110 to a server, such as, web server 12 to obtain the voice message. Also, the voice message may come from IVR 121 under some conditions. Using the IVR has the advantage of allowing the user to immediately respond with a voice message which can be captured by the IVR for delivery by voice or text to the original party.

The whisper message can be a prestored message contained in memory 101 of device 10-1 and identified as part of the SMS message received from notification server 13. Alternatively, the SMS message from notification server 13 could identify an external location from which to retrieve the whisper message. For example, a location on web server 12 can be identified by a URL (or other addressing scheme) such that mobile device 10-1 utilizes its communication channel to retrieve the message for presentation to headset 11 in the whisper mode. Note that while the "whisper" message arrives, in this example, over the communication channel, it can be delivered in the whisper mode, if desired. The sender of the message can control whether the message is only for communication if the receiving user is available or whether the message is to be delivered as a whisper message. This can be accomplished, at least in one embodiment, by codes traveling with the message. Note also that while the information coming over the audio channel is presumed in this example to be audio messages, it could be enhanced video or a combination of audio/video for display on a screen associated with device 10-1, or other commands, e.g., to launch a browser to a related web/wap/I-Mode page.

Thus, in practical operation, when a call arrives on a cell phone and assuming that the user is wearing a headset (wired or wireless), the callers' name can be communicated to the user as the call arrives using an audio "whisper" message. In such a situation the caller's name is identified in the cell phone by matching the incoming number with names stored in the telephone or in the network (with the user preferences regarding phone behavior, behavior for specific contact, or time of day behavior, etc.), or it would have arrived via a SMS message from an external translation, such as from screen 121 or the caller ID associated with the incoming call could be converted, perhaps by text to speech (TTS) engine 104. If desired, the caller's name could be provided as an audio message from a network-based IVR (121) to the user's device. If IVR 121 is used, then the called party could select to "accept," "reject," or reply with a message, voice or text, or using ASR in the handset, or if rejecting, not say or do anything.

The user then (optionally) can have the flexibility to take the call, reject the call, play a prerecorded message, such as "call me back later, I am in a meeting". The user can record a new message to be delivered immediately to the person ("call me back in 20 minutes at 213-XXX-0567"). The choices are indicated by the user with the option of voice commands or key commands, so the user can select whether he/she wants to openly speak the commands, or make the selections via the keypad or touch screen. In actual operation, while this flexibility could be provided, the system would more likely be configured such that the response filter would be triggered before the recipient hears the whisper message. Thus, the user could set certain or all users to "I'm in a meeting", so that the response message is sent without the recipient being disturbed. This may also be driven by time of day settings an/or calendar event settings.

This announcement process can be used with several extended types of message arrivals. For example, the arrival of an e-mail or voice message can also be announced by voice ("E-mail from John Jones—Topic: Next week's meeting.") This message would be spoken in the user's ear via the whisper mode, as an audio announcement. The text version of the message can be stored in the mobile device for archival purposes. The whisper message could, if desired, be dropped into a user's inbox (unified voicemail, email, fax, etc., mail box for all messaging), so that it can be reviewed at a later date, if immediate notification is not critical or not possible. Also, if desired, a SMS message that is sent to a user's phone can also be directed to an application server (not shown) over the communication channel where text-to-speech engine 18 would generate a voice version of the text message. That voice version of the text message would then be delivered as a whisper audio message to the user. The voice message sound activity arrives at the mobile device at the same time, or even before the text message arrives. The receiving user can elect to not have the whisper message delivered to the headset but instead have it stored. The receiving user can also elect to have the audio message delayed briefly until he/she can put the phone to his/her ear. Then the user can press a key to hear the message.

In some situations the mobile device itself can create a whisper message. For example, an internal clock alert can be set for a particular time and when that time arrives the clock can trigger a whisper message telling the user the time. Another example of such usage would be a calendar program that announces, in the whisper mode, that an appointment time has arrived. Note that the whisper message can be delivered to the user even when the user is in communication with another device, provided that the mobile device is operating in the four-wire manner such that communication originating locally is not communicated to the remote device. In this manner, sports scores, time alerts, stock prices, etc., can be delivered to the user of mobile device 10-1 even while the user is in communication with a remote party over the communication channel. These messages can be generated locally within the mobile device, or can be communicated to the mobile device using the data channel.

Figure 2:
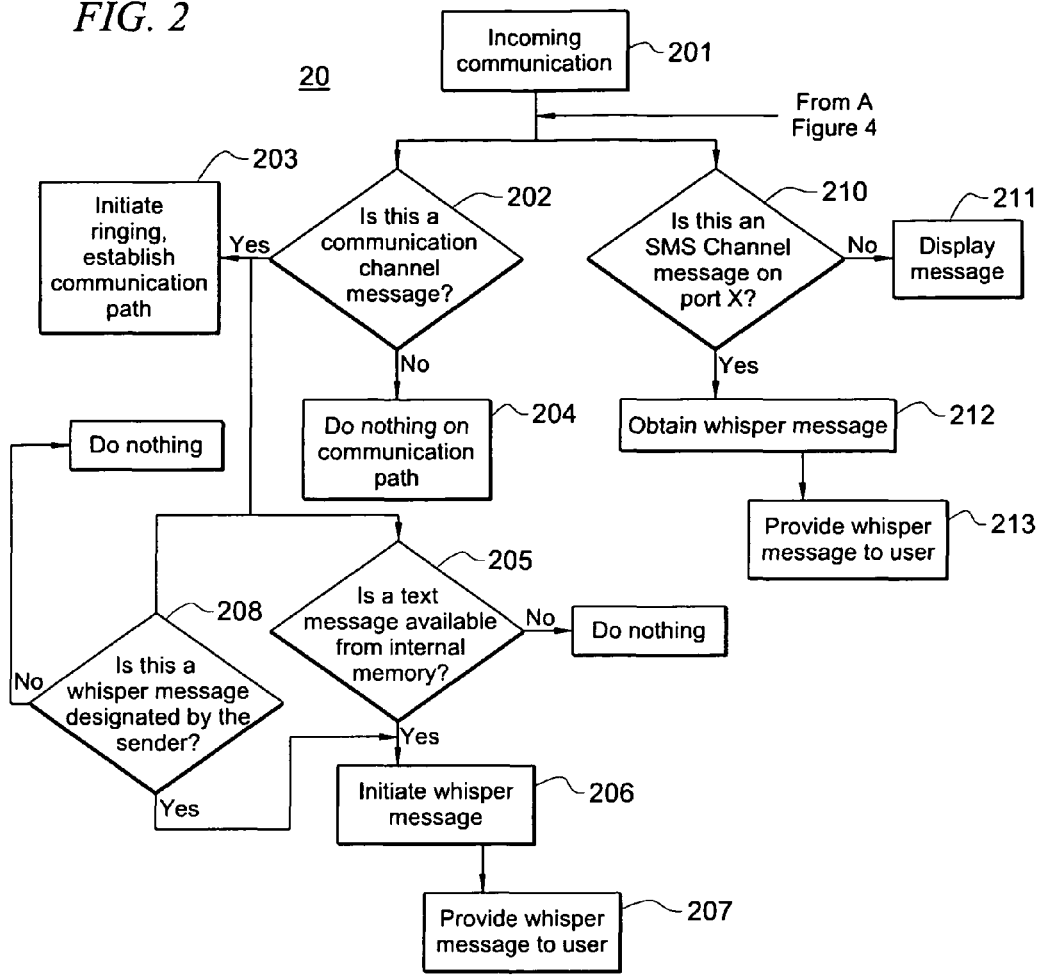
FIG. 2 shows one embodiment of a method for operation of an audible message system.

FIG. 2 shows one embodiment 20 of a method for operation of the audible message system, as shown in FIG. 1. In operation, process 201 handles an incoming communication to a mobile device, such as mobile device 10-1. Process 202 determines if the incoming communication is a communication channel message. If it is, then process 203 performs the normal call establishment routines, such as ringing, etc., which ends with the establishment of a communication path from the calling party to the called party, either via a speaker in the device or via a connection to headset 11. If process 202 determines the incoming communication is not a communication path message, then process 204 does nothing with respect to the incoming communication.

On a communication channel, communication process 205 determines whether a text message is available from internal memory. For example, if mobile device 10-1 has stored therein with an incoming call the name of a person associated with a telephone number and if the telephone number associated is a match with a stored number, then internal to the device a text message is created including the name of the calling party. Process 206 then would initiate a whisper message with the caller's name. Process 207 would provide the whisper message to the user such that in operation the user would hear a whisper message that would say, for example, "Incoming call from XYZ." The user can then initiate the call by saying, "Okay" or some other command, or could refuse the call (by saying nothing) and/or send a message back to the calling party that said, for example, "Please call back at a later time".

Figure 3:
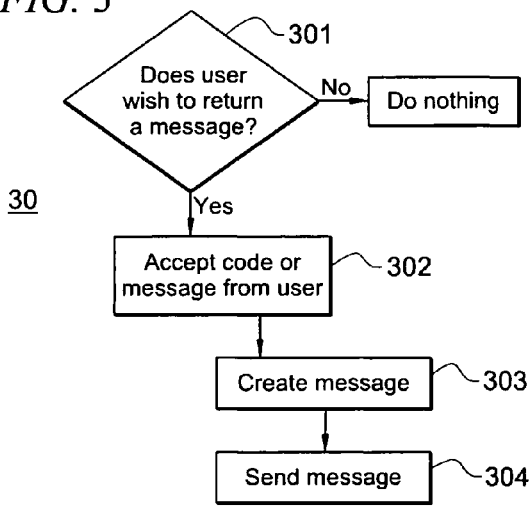
FIG. 3 shows one embodiment of a return-message system for use in conjunction with an audible message system.

Process 30 shown in FIG. 3, is an example of a method for controlling outgoing messages from a called user. Process 301 determines, based on a stimulus (voice command, by touch, etc.), if the called user desires to return a message to a calling party. Process 301 then accepts a code or a message from the called user and process 303 creates the message from either internally stored messages under a code control or listens to the audible message from the user and creates either a text or a audio message for communication either over the SMS channel or the audio channel to the caller person via process 304. As discussed, the message can be prestored in the mobile device, could be created in the mobile device casing, for example, ASR engine 103, or could be controlled by IVR 121.

Returning to FIG. 2, process 210 determines if the incoming message is an SMS channel message. If it is, and is not a message arriving on port X as shown in data flow 130 from FIG. 1, then the message is displayed on the screen of the mobile device in the normal manner via process 211. If, however, process 210 determines that this is an SMS channel message on port X, then process 212 obtains (or constructs) the whisper message, either from a set of stored messages within the device or, as discussed above, uses a URL (or other messaging scheme) to access a remote message. The system then either converts portions of the SMS received text to a audible message or retrieves a prestored audible message. This message is then communicated to the speaker of device 10-1 via process 213. As discussed above, this message can be provided in a manner such that it is distinctive, perhaps using the "whisper" inflection of speech (and/or the announcement could be preceded by a preparatory indicator, such as a 'bing' tone or vibration, etc.), such that a user understands that the message that is being received was created locally and is not a message that is being communicated live from a calling party at a remote device.

One example of the whisper mode of operation is that a call incoming to a recipient who is busy (for example, on a two-way communication via the communication channel or in a meeting) could receive a message from the recipient's device (or from a network IVR) saying in effect, "the party you are calling is busy right now. If you wish to leave a whisper message please do so now." If the calling party then leaves a message, the called party will be notified that they have an audible message. The system can be configured to deliver the caller's audio message either immediately upon call arrival (assuming the called party is wearing an earpiece), or after the called party authorizes playback of the message by a key press (if the called party must place the phone to his ear before listening to the message). Such an operation can be performed by using the messaging channels of both the calling and called devices, or by depositing the message from the calling party at a message server and having the called party's device communicate with the message server to obtain the whisper message. In some situations, the whisper message will only be delivered to the earpiece speaker of the device so that the message is heard in private.

The called party may wish to receive the callers' audio whisper massage as a text message. In this case, the audio message from the caller is converted into a text message using speech-to-text technology (most likely in a network-based server) that is then delivered in text form to the screen of the called party's device.

Another example would be when a party is in a situation where he/she can not speak but desires to send an audible whisper message to a an other party. In such a situation, the initiating party can type out the message using a keypad in the well-known manner. The typed text message can then be coded for delivery as a whisper message and sent to the called party over either the messaging channel or the communication channel. This operation would be handled for example, by process 208, FIG. 2. The recipient then would receive the text message and translate the text message to speech for delivery as a whisper message. Alternatively, the sending party's device could have translated the text message to speech and transmitted the speech message for playing to the recipient. In addition, the text message could be sent to a network-based speech server/IVR which would convert the text message into a voice message, which is then delivered as a whisper message.

Figure 4:
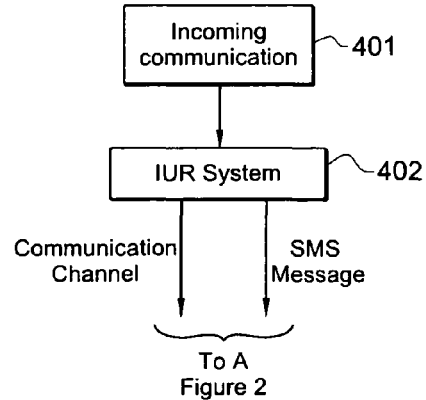
FIG. 4 shows one embodiment of a system having an intermediate switch for providing messages based on incoming call information.
Figure 5:
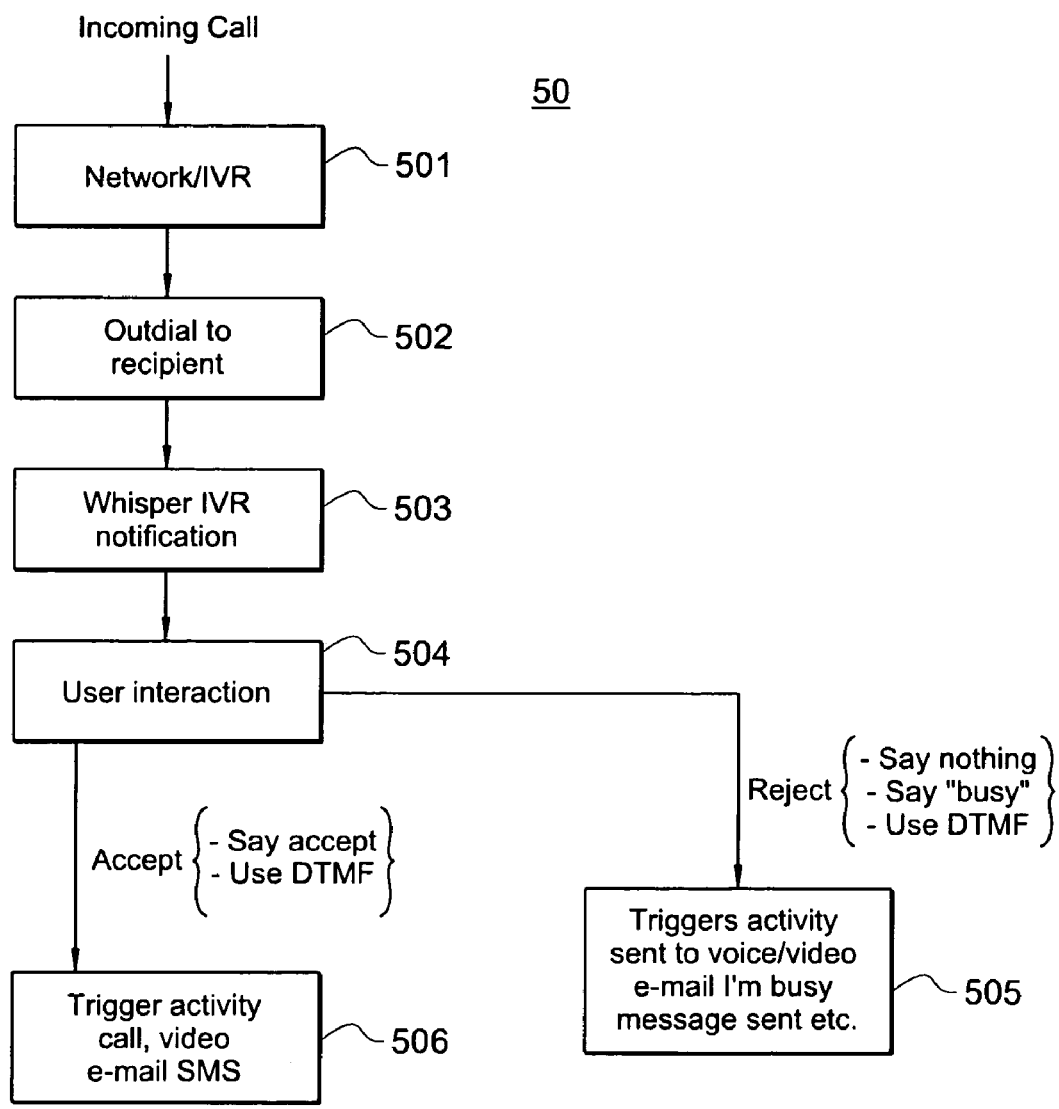
FIG. 5 shows one embodiment of a method using the system of FIG. 4.

FIG. 5 shows one embodiment 50 of a method using the IVR system (FIG. 4) such that the device functions as a web/voice browser dynamically driven from the network. As shown in FIG. 5, an incoming call is directed 501 to the network based IVR (402, FIG. 4) when the called party has configured his/her service to refuse live calls. The IVR out-dials (process 502) to the recipient's device, such as device 10-1, FIG. 1. Process 503 provides a whisper notification to the user.

Process 504 is the user (recipient's) interaction, such as reject or accept. When the user rejects the call, based on the whisper message, process 505 triggers some activity back to the IVR, which then can send the appropriate message to the calling party. When the user accepts the call, process 506 controls the connection of the calling party to the called party.

Figure 6:
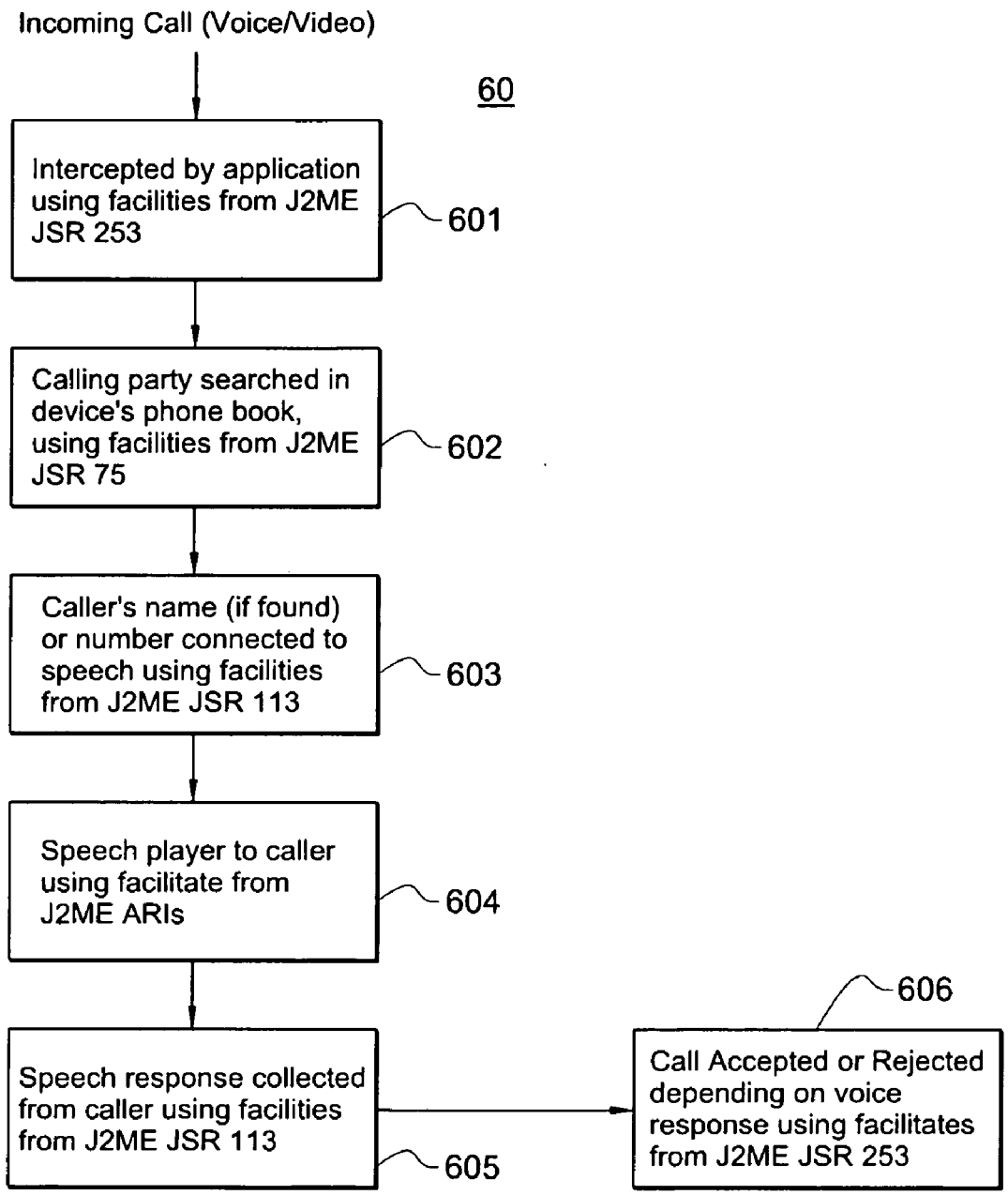
FIG. 6 illustrates one embodiment of the handling of an incoming call yielding a whisper message.

FIG. 6 illustrates one embodiment 60 of the handling of an incoming call yielding a whisper message. In operation, process 601 interrupts the call using facilities from, for example, the JAVA 2 platform MicroEdition (J2ME) within the called device. Process 602 searches the devices' phonebook using, for example, facilities from J2ME in combination with Mobile Information Device Profiles (JSR 75) which are available from the JAVA community process.

Process 603 converts the name (if found) or the incoming number (from, for example, ANI) to speech using facilities from J2ME and JSR 113.

Process 604 plays the converted speech to the user (as a whisper message) using facilities from J2ME application program interfaces (API).

If a speech response is available, process 605 controls the response, for example, using facilities form J2ME and JSR 113 and process 606 controls the connection according to the called party response using facilities from J2ME and JSR 253.

Figure 7:
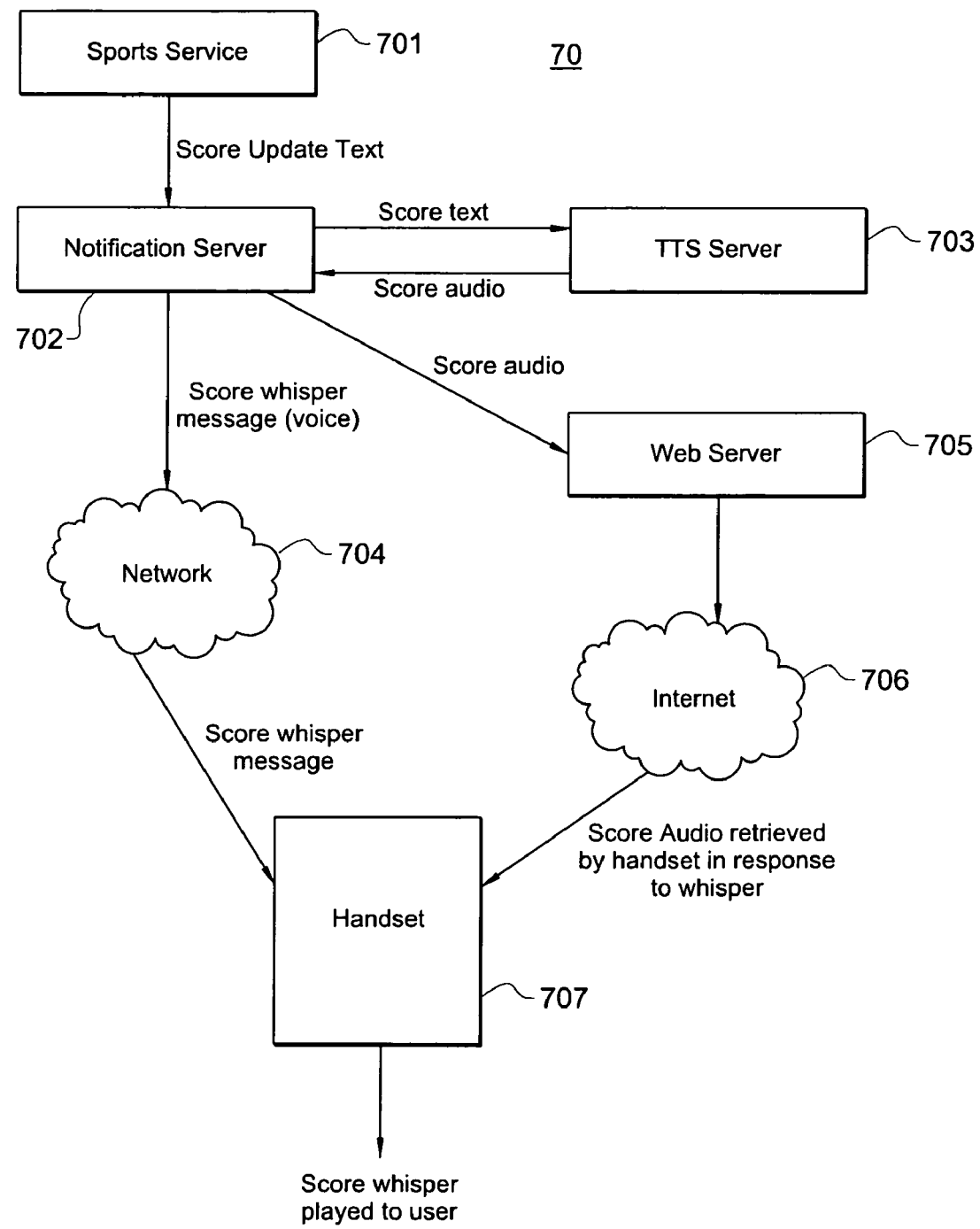
FIG. 7 shows one embodiment of the delivery of a whisper message using internet protocol.

FIG. 7 shows one embodiment 70 of the delivery of a whisper message that is not part of an incoming two-way communication. In the example shown, sports service 701, provides scores in text format to notification server 702. The text, in this embodiment, is sent from notification sever 702 to text to speech (TTS) server 703 and audio (the score in verbal format) is returned to the server. The notification server then sends the score message (which can be video and/or audio), and includes an internet provider (IP) address via network 704 to device handset 707. The user can listen to the message in normal mode, but if the communication channel is being used, the IP address will arrive at the handset. The handset then, using the IP address, can retrieve (via internet 706) the message that was stored in web server 705 at the IP address provided by the handset. The whisper message (sports score) is then played to the user of device 707 via the headset, as discussed above.

Using this system and method, a user may be able to keep a mobile device, such as a cell phone, in a pocket or purse and when an incoming call arrives a whisper announcement is made available to a headset so that the user can take the call or reject the call by knowing who is calling, thereby eliminating the need to retrieve the device to read the name on the device display.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
configuring a first port of a plurality of ports of a mobile device adapted to receive digital messages as a port to provide notification messaging to a user of the mobile device in a format non-native to the digital messages;
configuring a second port of the plurality of ports of the mobile device adapted to receive the digital messages as a port to provide delivery of the digital messages in a format native to the digital messages;
receiving a digital message at the mobile device;

if the message is directed to the first port, providing notification messaging regarding the received digital message to the user in the format non-native to the received digital message; and if the message is directed to the second port, providing output of the received digital message to the user in the format native to the received digital message;

wherein, as used herein, "port" means a number used for routing communications; and wherein "the message is directed to the first port" means that the message, at the time the message is received at the mobile device, has a header identifying the first port.

2. The method of claim 1 wherein the notification message is sent to an earpiece speaker of the mobile device.

3. The method of claim 1 wherein providing notification messaging comprises retrieving a prestored message from memory within the mobile device and presenting the prestored message to the user.

4. The method of claim 1 wherein providing notification messaging comprises retrieving a prestored message from memory located remote from the mobile device and presenting the prestored message to the user.

5. The method of claim 1 wherein the notification messaging provides notification to the user without providing full content of the digital message to be delivered to the user.

6. The method of claim 1 wherein the digital messages comprise short message service messages.

7. The method of claim 1 further comprising: returning a digital message from the mobile device in response to the received digital message at the mobile device.

8. The method of claim 7 wherein at least a portion of said returned message is a prestored message.

9. A method comprising:
configuring a mobile device to provide whisper messaging to a user, the whisper messaging providing audio notification of selected messages to be delivered to the user, wherein the selected messages comprise a subset of less than all messages directed to the mobile device during active operation of the whisper messaging;
receiving a message at the mobile unit;
determining, based on information obtained from the received message, if the whisper messaging is to be invoked with respect to the received message; and
providing audio notification of the received message to the user if it is determined that the whisper messaging is to be invoked with respect to the received message;
wherein, as used herein, "determining, based on information obtained from the received message, if the whisper messaging is to be invoked with respect to the received message" comprises determining, based on a port identified in a header for the received message, if the whisper messaging is to be invoked with respect to the receive message, and
wherein "port" means a number used for routing communications.

10. The method of claim 9 wherein the whisper message is sent to an earpiece speaker of the mobile device.

11. The method of claim 9 wherein the received message comprises a short message service message.

12. The method of claim 9 wherein the received message comprises a voice message.

13. The method of claim 9 wherein the audio notification provides notification to the user without providing full content of the received message.

14. The method of claim 9 wherein providing the audio notification comprises retrieving a prestored message for delivery to the user, and wherein the prestored message is retrieved from a memory within the mobile device.

15. The method of claim 9 wherein providing the audio notification comprises retrieving a prestored message for delivery to the user, and wherein the prestored message is retrieved from a memory remote from the mobile device.

16. The method of claim 9 further comprising: returning a message from the mobile device in response to the received message.

17. The method of claim 16 wherein the returned message comprises a short message service message.

18. A mobile device comprising a memory comprising:
code for determining if a notification message is to be invoked with respect to a communication received at the mobile device, said determining based on information obtained from the received communication; and
code for providing audio notification of the received communication to a user of the mobile device if it is determined the notification message is to be invoked with respect to the received communication;
wherein, as used herein, "determining if a notification message is to be invoked with respect to a communication received at the mobile device" comprises determining, based on a port identified in a header for the received communication, if the notification message is to be invoked with respect to the received communication; and
wherein "port" means a number used for routing communications.

19. The mobile device of claim 18 wherein the received communication comprises a short message service message.

20. The mobile device of claim 18 wherein the received communication comprises a voice message.

21. The mobile device of claim 18 further comprising:
code for returning a communication from the mobile device in response to the received communication, wherein the returned communication is a prerecorded message retrieved from a memory when the user of the mobile device provides a stimulus to the mobile device.

22. The mobile device of claim 21 wherein the code for returning operates as a function of a selection from the list consisting of: a time of day setting and a calendar event setting.

23. The mobile device of claim 21 wherein the code for returning operates as a function of a setting for when the user is unavailable.

24. The mobile device of claim 23 wherein said user's unavailability is applicable only to certain senders of communications received at the mobile device.

25. The mobile device of claim 21 wherein the returned communication is an SMS message.

* * * * *

UNITED STATES PATENT AND TRADEMARK OFFICE
CERTIFICATE OF CORRECTION

| | | |
|---|---|---|
| PATENT NO. | : 7,949,353 B2 | |
| APPLICATION NO. | : 11/349051 | |
| DATED | : May 24, 2011 | |
| INVENTOR(S) | : Pollock et al. | |

It is certified that error appears in the above-identified patent and that said Letters Patent is hereby corrected as shown below:

Column 9, Claim 9, line 52 reads "… receive…"; which should be deleted and replaced with "… received…."

Signed and Sealed this
Twenty-eighth Day of June, 2011

David J. Kappos
*Director of the United States Patent and Trademark Office*